United States Patent
Andreasen et al.

(10) Patent No.: US 9,374,619 B2
(45) Date of Patent: *Jun. 21, 2016

(54) SYSTEM AND METHOD FOR ENABLING PAIRING OF A COMPANION DEVICE WITH A MATE DEVICE FOR PERFORMING A COMPANION DEVICE

(71) Applicant: CISCO TECHNOLOGY, INC., San Jose, CA (US)

(72) Inventors: Flemming S. Andreasen, Marlboro, NJ (US); Gil C. Cruz, Hampton, NJ (US); Nick George Pope, Suwanee, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,202

(22) Filed: Jan. 28, 2014

(65) Prior Publication Data

US 2014/0165090 A1    Jun. 12, 2014

Related U.S. Application Data

(63) Continuation of application No. 13/543,754, filed on Jul. 6, 2012, now Pat. No. 8,676,995.

(60) Provisional application No. 61/505,358, filed on Jul. 7, 2011.

(51) Int. Cl.
 *G06F 15/16* (2006.01)
 *G09B 21/00* (2006.01)
 (Continued)

(52) U.S. Cl.
 CPC ........ *H04N 21/4627* (2013.01); *H04L 63/0815* (2013.01); *H04N 21/2665* (2013.01);
 (Continued)

(58) Field of Classification Search
 CPC ............... H04N 21/4627; H04N 21/64322; H04N 21/4227; H04N 21/2665; H04N 21/4104; H04N 21/6125; H04N 21/4622; H04L 63/0815; H04L 41/00
 USPC .............. 709/207, 223, 227, 228; 340/4.11; 348/119, 734; 713/170, 176; 725/93, 725/116, 146; 726/2
 See application file for complete search history.

(56) References Cited

U.S. PATENT DOCUMENTS 5,754,771 A    5/1998  Epperson et al.
7,650,505 B1   1/2010  Masurkar
(Continued)

FOREIGN PATENT DOCUMENTS

CN    103782571 A       5/2014
WO    WO2013/006839     1/2013
WO    WO2013/006844     1/2013

OTHER PUBLICATIONS

Lee Cody, "How to use AirPlay® with your iPhone®," iDownloadBlog, Mar. 11, 2011; 6 pages; http://www.idownloadblog.com/2011/03/11/how-to-use-airplay-with-your-iphone/.*

(Continued)

*Primary Examiner* — Hoang-Vu A Nguyen-Ba

(74) *Attorney, Agent, or Firm* — Patent Capital Group

(57) ABSTRACT

A method is provided in one example embodiment and includes establishing a connection between a first client and a messaging fabric of a conductor element associated with a video system; receiving a request to perform a companion service with a second client; authenticating the first client via a client directory based on an identifier associated with the first client; receiving a pair message from the first client for the second client; and verifying whether the two clients can be paired in order to perform the companion service. Companion service commands can be authorized/policy checked and resulting commands on the second client may appear as-if they had been triggered locally.

22 Claims, 10 Drawing Sheets

(51) Int. Cl.

| | | |
|---|---|---|
| *H04N 5/44* | (2011.01) | |
| *H04L 9/32* | (2006.01) | |
| *H04N 21/4627* | (2011.01) | |
| *H04L 29/06* | (2006.01) | |
| *H04N 21/2665* | (2011.01) | |
| *H04N 21/41* | (2011.01) | |
| *H04N 21/462* | (2011.01) | |
| *H04N 21/61* | (2011.01) | |
| *H04N 21/4227* | (2011.01) | |
| *H04N 21/643* | (2011.01) | |
| *G06F 15/173* | (2006.01) | |
| *H04N 7/00* | (2011.01) | |
| *H04N 7/173* | (2011.01) | |
| *H04N 7/16* | (2011.01) | |
| *G06F 7/04* | (2006.01) | |
| *H04L 12/24* | (2006.01) | |

(52) U.S. Cl.
CPC ....... *H04N21/4104* (2013.01); *H04N 21/4227* (2013.01); *H04N 21/4622* (2013.01); *H04N 21/6125* (2013.01); *H04N 21/64322* (2013.01); *H04L 41/00* (2013.01)

(56) References Cited

U.S. PATENT DOCUMENTS

| | | |
|---|---|---|
| 8,104,066 B2 | 1/2012 | Colsey et al. |
| 8,327,019 B2 | 12/2012 | Gould et al. |
| 8,468,271 B1 | 6/2013 | Panwar et al. |
| 8,676,995 B1 | 3/2014 | Andreasen et al. |
| 2005/0048961 A1 | 3/2005 | Ribaudo et al. |
| 2005/0177750 A1 | 8/2005 | Gasparini et al. |
| 2006/0130069 A1 | 6/2006 | Srinivasan et al. |
| 2006/0174277 A1 | 8/2006 | Sezan |
| 2007/0080823 A1 | 4/2007 | Fu et al. |
| 2007/0094304 A1 | 4/2007 | Horner |
| 2007/0107019 A1 | 5/2007 | Romano et al. |
| 2007/0113269 A1 | 5/2007 | Zhang |
| 2008/0034097 A1 | 2/2008 | Nomura et al. |
| 2008/0065775 A1 | 3/2008 | Polk |
| 2008/0140709 A1 | 6/2008 | Sundstrom |
| 2008/0192770 A1 | 8/2008 | Burrows et al. |
| 2008/0275982 A1 | 11/2008 | Busch et al. |
| 2008/0292074 A1 | 11/2008 | Boni et al. |
| 2009/0067441 A1 | 3/2009 | Ansari et al. |
| 2009/0168787 A1 | 7/2009 | Ansari et al. |
| 2009/0177782 A1 | 7/2009 | Blatherwick et al. |
| 2009/0228584 A1 | 9/2009 | Maes |
| 2009/0241104 A1 | 9/2009 | Amiga et al. |
| 2009/0292773 A1 | 11/2009 | Leedberg |
| 2009/0319611 A1 | 12/2009 | Turakhia |
| 2010/0005171 A1 | 1/2010 | Arolovitch |
| 2010/0057680 A1 | 3/2010 | Little |
| 2010/0158476 A1 | 6/2010 | Hao et al. |
| 2010/0162294 A1 | 6/2010 | Yin et al. |
| 2010/0202450 A1 | 8/2010 | Ansari et al. |
| 2010/0211678 A1 | 8/2010 | McDysan et al. |
| 2010/0231790 A1 | 9/2010 | Ansari et al. |
| 2010/0242079 A1 | 9/2010 | Riedl et al. |
| 2010/0287609 A1 | 11/2010 | Gonzalez |
| 2010/0299187 A1 | 11/2010 | Duggal |
| 2011/0030018 A1 | 2/2011 | Mizuno et al. |
| 2011/0055893 A1 | 3/2011 | Walls |
| 2011/0099228 A1 | 4/2011 | Smith |
| 2011/0103265 A1 | 5/2011 | Dilipkumar |
| 2011/0113122 A1 | 5/2011 | Drope |
| 2011/0126296 A1 | 5/2011 | Moore |
| 2011/0252082 A1 | 10/2011 | Cobb et al. |
| 2011/0289496 A1 | 11/2011 | Steer |
| 2011/0295942 A1 | 12/2011 | Raghunath et al. |
| 2011/0295966 A1 | 12/2011 | Morris |
| 2011/0307623 A1 | 12/2011 | George et al. |
| 2011/0320575 A1 | 12/2011 | Pope et al. |
| 2011/0320585 A1 | 12/2011 | Pope et al. |
| 2011/0321062 A1 | 12/2011 | Pope et al. |
| 2012/0011207 A1 | 1/2012 | Morris |
| 2012/0079066 A1 | 3/2012 | Li |
| 2012/0084356 A1 | 4/2012 | Ferdi |
| 2012/0174157 A1 | 7/2012 | Stinson et al. |
| 2012/0209926 A1 | 8/2012 | Backholm et al. |
| 2012/0246295 A1 | 9/2012 | Gonzalez-Banos |
| 2012/0304233 A1 | 11/2012 | Roberts et al. |
| 2012/0304245 A1 | 11/2012 | Lawson |
| 2012/0311038 A1 | 12/2012 | Trinh et al. |
| 2013/0007813 A1 | 1/2013 | Baskaran et al. |
| 2013/0013688 A1 | 1/2013 | Wang et al. |
| 2013/0013698 A1* | 1/2013 | Relyea et al. ................. 709/206 |
| 2013/0013704 A1 | 1/2013 | Pope et al. |
| 2014/0201645 A1 | 7/2014 | Mo |
| 2014/0335823 A1 | 11/2014 | Heredia |

OTHER PUBLICATIONS

USPTO Mar. 25, 2014 Final Office Action from U.S. Appl. No. 13/543,775.
USPTO May 1, 2014 Non-Final Office Action from U.S. Appl. No. 13/543,780.
USPTO Mar. 6, 2014 Non-Final Office Action from U.S. Appl. No. 13/543,620.
USPTO Mar. 7, 2014 Non-Final Office Action from U.S. Appl. No. 13/543,692.
U.S. Appl. No. 13/543,775 entitled System and Method for Unified Metadata Brokering and Policy-Based Content Resolution in a Video Architecture filed Jul. 6, 2012, Inventor(s): Neil Black,et al.
USPTO Jul. 12, 2013 Non-Final Office Action from U.S. Appl. No. 13/543,775.
USPTO Aug. 19, 2013 Final Rejection from U.S. Appl. No. 13/543,775.
USPTO Dec. 17, 2013 Non-Final Office Action from U.S. Appl. No. 13/543,775.
U.S. Appl. No. 13/543,780 entitled System and Method for Content Access Protection and Session Tracking With Adaptive Bitrate filed Jul. 6, 2012, Inventor(s): David Stuart Morgan,et al.
U.S. Appl. No. 13/543,769 entitled System and Method for Topic-Based Eventing for Flexible System Management filed Jul. 6, 2012, Inventor(s): Nick George Pope,et al.
"XMPP PubSub," White Paper, Isode, Jul. 13, 2011, 6 pages http://www.isode.com/whitepapers/xmpp-pubsub.html.
Barth, "HTTP State Management Mechanism," Internet Engineering Task Force (IETF), RFC 6265, Apr. 2011, 37 pages; http://www.ietf.org/rfc/rfc6265.txt.pdf.
Brand, Richard, et al., "IPTV Content on Demand Service Architecture," an ATIS Webinar, Apr. 21, 2011, 26 pages.
Gerhards, "The Syslog Protocol," Network Working Group, RFC 5424, Mar. 2009, 38 pages; http://www.ietf.org/rfc/rfc5424.txt.pdf.
Harrington, et al., "An Architecture for Describing Simple Network Management Protocol (SNMP) Management Frameworks," Network Working Group, RFC 3411, Dec. 2002, 64 pages; http://www.ietf.org/rfc/rfc3411.txt.pdf.
Lubke, Robert, et al., "MobilisGroups: Location-based group formation in Mobile Social Networks," Pervasive Computing and Communications Workshops (PERCOM Workshops), 2011 IEEE International Conference on, IEEE, Mar. 21, 2011.
Millard, Peter, et al., "XEP-0060: Publish-Subscribe," Jul. 12, 2010, © 1999-2012 XMPP Standards Foundation, 240 pages http://xmpp.org/extensions/xep-0060.html.
Nawrocki, Mike, "ATIS IPTV Standards Development via ATIS' IPTV Interoperability Forum (IIF)," GSC-16 Halifax Canada 2011, 67 pages.
Schuster, Daniel, et al., "Service-based development of mobile real-time collaboration aplications for Social Networks," Pervasive Computing and Communications Workshops (PERCOM Workshops(, 2010 8*th* IEEE International Conference on, IEEE, Piscataway, NJ, USA, Mar. 29, 2010; 6 pages.
Thompson, B., et al., "ATIS Internet Sourced Content Initiative and Relevance to CDNI," Network Working Group Internet Draft draft-thompson-cdni-atus-scenarios-00, Mar. 29, 2011, 16 pages.

(56) References Cited

OTHER PUBLICATIONS

PCT Oct. 24, 2012 International Search Report and Written Opinion from International Application PCT/U52012/045851; 10 pages.
PCT Jan. 7, 2014 International Preliminary Report on Patentability from International Application PCT/U52012/045851; 7 pages.
PCT Oct. 10, 2012 International Search Report and Written Opinion from International Application PCT/US2012/045858; 10 pages.
PCT Jan. 7, 2014 International Preliminary Report on Patentability from International Application PCT/US2012/045858; 6 pages.
USPTO Aug. 11, 2014 Final Office Action from U.S. Appl. No. 13/543,620.
USPTO Aug. 11, 2014 Final Office Action from U.S. Appl. No. 13/543,692.
USPTO Jul. 17, 2014 Notice of Allowance from U.S. Appl. No. 13/543,775.
USPTO Oct. 30, 2014 Non-Final Office Action from U.S. Appl. No. 13/543,780.
USPTO Jul. 18, 2014 Non-Final Office Action from U.S. Appl. No. 13/543,769.
Ma et al., "A Lightweight Agent Fabric for Service Autonomy," IBM China Research Lab, SOCASE 2007, May 2007; LNCS 4504, pp. 63-77.
USPTO Dec. 19, 2014 Non-Final Office Action from U.S. Appl. No. 13/543,620.
USPTO Apr. 20, 2015 Final Office Action from U.S. Appl. No. 13/543,620.
USPTO Jan. 5, 2015 Non-Final Office Action from U.S. Appl. No. 13/543,692.
Lee, Cody, "How to use AirPlay® with your iPhone®," iDownloadBlog, Mar. 11, 2011; 6 pages http://www.idownloadblog.com/2011/03/11/how-to-use-airplay-with-your-iphone/.
USPTO May 6, 2015 Final Office Action from U.S. Appl. No. 13/543,780.
USPTO Apr. 1, 2015 Final Office Action from U.S. Appl. No. 13/543,769.
PRC Feb. 3, 2016 SIPO First Office Action from Chinese Application Serial No. CN201280043457.
USPTO Mar. 24, 2016 Final Office Action from U.S. Appl. No. 13/543,620.
USPTO Mar. 25, 2016 Non-Final Office Action from U.S. Appl. No. 13/543,692.
USPTO Dec. 30, 2015 Non-Final Office Action from U.S. Appl. No. 13/543,769.

* cited by examiner

SYSTEM AND METHOD FOR ENABLING PAIRING OF A COMPANION DEVICE WITH A MATE DEVICE FOR PERFORMING A COMPANION DEVICE

CROSS-REFERENCE TO RELATED APPLICATION

This application claims the benefit of priority under 35 U.S.C. §119(e) to U.S. Provisional Application Ser. No. 61/505,358, entitled "VIDEOSCAPE SYSTEM PLATFORM" filed Jul. 7, 2011, which is hereby incorporated by reference in its entirety.

This application is a continuation (and claims the benefit of priority under 35 U.S.C. §120) of U.S. application Ser. No. 13/543,754, filed Jul. 6, 2012, entitled "SYSTEM AND METHOD FOR CROSS-SCREEN EXPERIENCES AND COMPANION DEVICE SERVICES IN A VIDEO ARCHITECTURE," Inventors Flemming S. Andreasen, et al. The disclosure of the prior application is considered part of (and is incorporated by reference in) the disclosure of this application.

TECHNICAL FIELD

This disclosure relates in general to the field of communications and, more particularly, to a system and a method for cross-screen experiences and companion device services in a video architecture.

BACKGROUND

Service providers face difficult challenges in the context of providing video services for a diverse group of end-users. Many service providers are gearing up to implement their 'TV Everywhere' initiatives, which can offer a level of freedom being demanded by consumers today. One aspect of this demand includes the ability to access content from any device at any time and from any location. Providing an effective integration of various technologies, while accounting for specific device options, specific location possibilities, specific user preferences, specific content and programming, etc. is a significant challenge for service providers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a connection (e.g., wired, wireless, etc.) between a first client and a messaging fabric of a conductor element associated with a video system; receiving a request (e.g., any suitable message) to perform a companion service with a second client (e.g., a set-top box). The method also includes authenticating the first client via a client directory based on an identifier associated with the first client. The identifier can include any suitable identification mechanism. The method also includes receiving a pair message from the first client for the second client (e.g., set-top box); and verifying whether the second client (e.g., set-top box) and the first client can be paired in order to perform the companion service. The companion service can be associated with any activity, operation, function, or task involving video data.

In more particular implementations, a particular pair message can be forwarded to a set-top box (i.e., the second client) to complete a pairing between the first client and the second client. In addition, the method could also include receiving a particular message associated with the first client acting as a remote control for the second client; and verifying the pairing of the first client and the second client in order to perform at least one remote control activity for the video system. A particular service can be invoked by a device in order to support a particular feature of the video system.

The method can also include receiving a service message via the conductor element, where the service message is associated with a pairing activity associated with the second client (e.g., a set-top box). A particular service can issue companion service commands after the pairing activity has been authorized. In addition, the method can include invoking a cloud session state manager in order to identify a channel being watched on the video system. The actual connection can establish an Extensible Messaging and Presence Protocol (XMPP)-based service.

Example Embodiments

Figure 1:
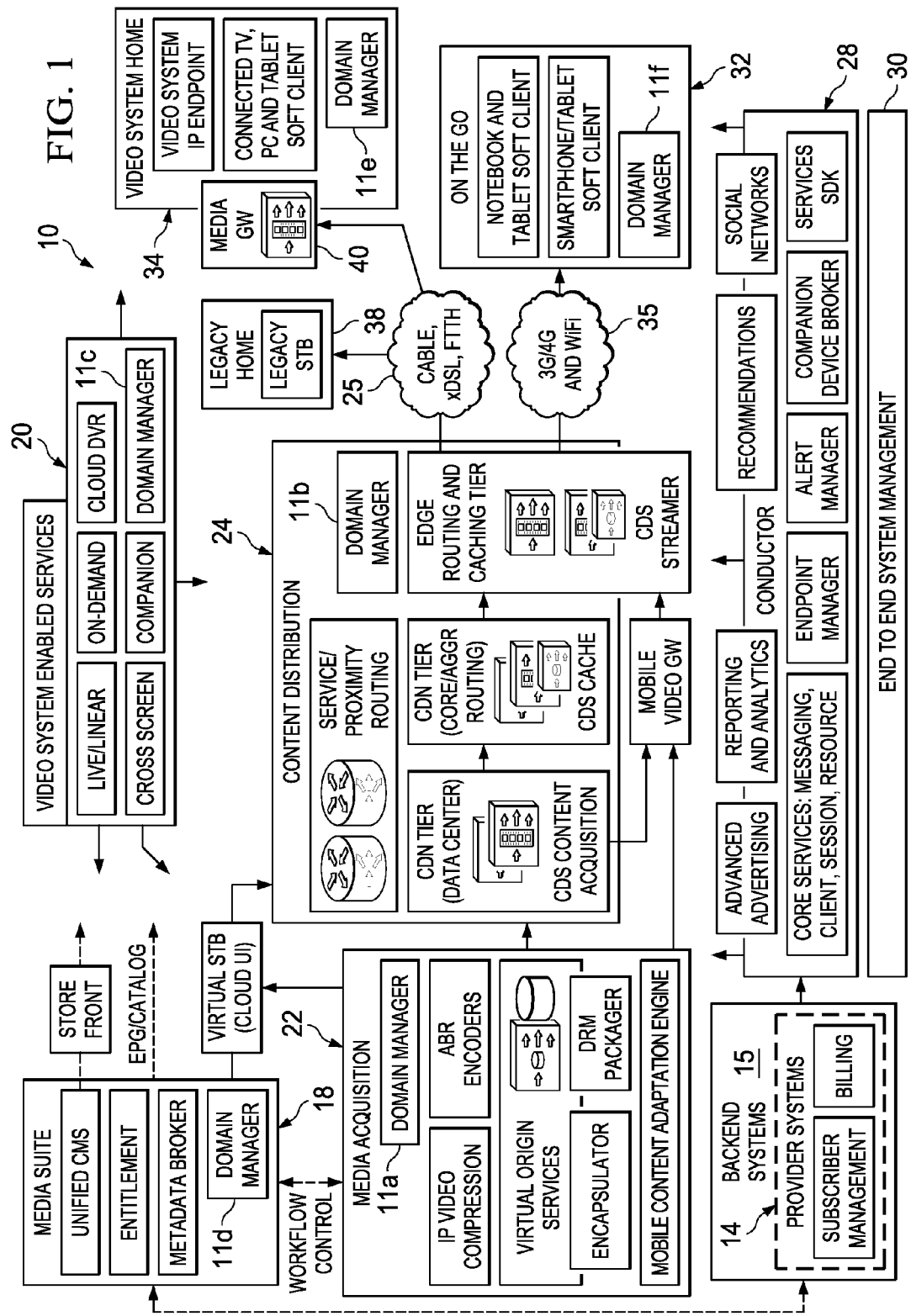
FIG. 1 is a simplified block diagram of a video system for providing a video platform in accordance with one embodiment of the present disclosure.

Turning to FIG. 1, FIG. 1 is a simplified block diagram of a video system 10 configured for providing an integrated video platform in accordance with one embodiment of the present disclosure. Video system 10 may include a plurality of backend systems 15, which may further include a number of provider systems 14 that are inclusive of subscriber management and billing. In addition, video system 10 may include a media suite 18 for content and metadata management, which may be coupled to a media acquisition 22 for content processing. A video system enabled services element 20 may be suitably linked to media suite 18, media acquisition 22, and a content distribution 24.

Additionally, any number of networks may suitably couple content distribution 24 to a video system home 34, as well as an "on the go" component 32, which may be associated with wireless activities, roaming, WiFi, end-user devices more generally, etc. In one particular example being illustrated in FIG. 1, a 3G/4G and WiFi network 35, along with a cable, xDSL, FTTH network 25 are being used to facilitate the activities of the video platform. FIG. 1 also includes a conductor 28 video control plane, which can be suitably coupled to media acquisition 22, content distribution 24, and an end to end system management 30. Note that the larger blocks of FIG. 1 (e.g., conductor 28, content distribution 24, media suite 18, video system enabled services 20, vide system home 34, media acquisition, 22, etc.) can be viewed as logical suites that can perform certain activities of the present disclosure. Note that their functions, responsibilities, tasks, capabilities, etc. can be distributed in any suitable manner, which may be based on particular video needs, subscription models, service provider arrangements, etc.

In accordance with the teachings of the present disclosure, video system 10 is configured to offer service providers a number of valuable features. For example, video system 10 is configured to extend video services to a variety of devices ranging from smartphones, tablets, iPads, personal computers (PCs), to set-top boxes (e.g., n-screen), cable systems, etc. Additionally, this platform of video system 10 is configured to extend video services to any IP access network (un-tethering). The architecture can also provide unified content management between different devices, different networks, and different video services. Additionally, the architecture can provide a flexible platform and infrastructure that enables existing services to be modified (and for new services to be developed by the service provider) by leveraging a combination of Internet protocol (IP), hypertext transfer protocol (HTTP)/web-services, Extensible Messaging and Presence Protocol (XMPP) and a workflow-enabled infrastructure with open interfaces and both client and server software development kits (SDKs). An initial set of applications can also be provided (e.g., linear, time-shift, on-demand, etc.).

Additionally, the architecture can use adaptive bitrate (ABR) to facilitate video service delivery (independent of the access). This allows a video offering that can be targeted at consumers, which can offer "Anywhere, Any Access" that may be tied to subscription models. In addition, video system 10 can readily support unicast and multicast delivery with in-home cache optimizations for more efficient use of access network resources. This can include support for content protection, thereby enabling delivery of all content (not merely a subset of content). This also includes support for existing critical features such as Emergency Alert Service, Blackouts, Geo-Blocking, etc. Support is also provided for advertising (including dynamic ad support) and for legacy devices (primarily existing endpoint devices (e.g., set-top boxes (STBs)) for a smooth migration of existing infrastructure.

The architecture can also support hybrid optimizations for access providers to implement (e.g., in order to enhance their offering). In this context, hybrid is referring to the combination of traditional service provider video delivery technologies (e.g., MPEG transport stream over quadrature amplitude modulation (QAM) in a cable hybrid fiber-coaxial (HFC) environment) with pure IP video delivery technologies (e.g., HTTP-based adaptive bitrate).

In operation, communication system 10 can support the following end-user oriented use cases: 1) content discovery; 2) linear services for managed IP STBs and unmanaged devices (where migration for existing linear services is supported equally); 3) on-demand services for managed IP STBs and unmanaged devices (where migration for existing on-demand services is supported); 4) time-shifted TV services (e.g., in the form of Cloud DVR/time-shifted TV across screens for managed IP STBs and unmanaged devices (where migration for existing DVR services is supported); 5) cross-screen experience in the form of companion devices, where a companion device (e.g., iPhone) can be used as a remote control for another video system device (e.g., IP STB), or the companion device can enhance the viewing experience through value add/context or programming aware metadata information (e.g., FACEBOOK/TWITTER feeds, additional program detail, hyperlinks, etc.); 6) screen-shifting, where the user is able to change playback to another device (e.g., from iPad to TV), pause and resume programs across devices, or have multi-room DVRs; 7) dynamic advertising; and 8) value add applications, which enable service providers to offer value add user experiences (e.g., such as FACEBOOK connect capabilities, access to Olympics Applications, etc.).

Note that video services have traditionally been provided in a siloed fashion. Linear TV services were provided by Cable, Telco, or Satellite companies over legacy non-IP based infrastructures with service offerings that expanded to include time-shift, on-demand, and DVR type services. Services were offered to managed devices (e.g., a STB) on managed networks only (e.g., QAM-based cable). As IP infrastructure with relatively high bandwidth became more prevalent, a second wave of IPTV-based video systems appeared. A common theme in these systems is an IP multicast-based linear service, real-time streaming protocol (RTSP)-based on-demand (etc.) service, and a session initiation protocol (SIP)/IP multimedia subsystem (IMS) plus RSTP control plane, and/or an HTTP/web services plus RTSP based control plane coupled with metadata management (e.g., electronic program guide (EPG)) towards the end-users typically based on HTTP/web services. IPTV content delivery was generally assumed to be a fixed bitrate over managed networks (either supporting resource reservations to satisfy certain levels of service or simply having plentiful bandwidth).

A new 3rd wave of systems is now being considered with a design principle of any content to any device anywhere at any time. HTTP adaptive bitrate enables this model in the content delivery domain; however, for a service provider to provide premium video services, a control plane infrastructure is still needed. The existing IPTV based control plane architecture and solutions fall short in a number of areas needed to support the above 3rd wave systems in today's web-based environment, including: 1) a lack of consideration and service for HTTP ABR based content delivery, which does not have the notion of a "network" or cloud session (e.g., for troubleshooting, diagnostics, statistics, policy enforcement (upper limit on sessions)), etc.; and 2) the HTTP Simple Object Access Protocol/REpresentational State Transfer (REST)(SOAP/REST) based video control plane architectures fall short in several areas. This includes an inability to work through NATs (e.g., to support notification type services to clients (emergency alerts, operator initiated messaging/diagnostics, etc.)). This also includes bidirectional communication support and a way for cloud-initiated communication to target households, users, and/or specific devices are missing (e.g., eventing), and authentication/authorization considerations around such cloud-initiated communication is missing as well. In addition, such models work as request-response protocols in the client-server computing model, and they are generally not session-stateful, which is needed for some premium video services. These HTTP-based services do not retain information or status of each user for the duration of multiple requests. Therefore, when HTTP-based web services are deployed over a large cluster, it is difficult to track the user's progress from one request to another, unless a centralized database is used to track it.

The SIP/IMS-based video control planes provide persistent connections with bidirectional support and notification services, which solve several of the shortcomings of the HTTP-based control planes. However, the SIP/IMS based architectures fall short in several other areas as well (e.g., they are defined only for SIP/IMS-based services to be invoked and advertised). In today's world, ease of integration with HTTP and XML-based services is important. Additionally, SIP/IMS is based on a call setup model, whereby services are invoked as part of an incoming or outgoing session setup. Events within or outside of a session are supported as well. As a result of this, IMS service creation, composition, and interaction relies on the notion of IMS filter criteria, which are (statically defined) trigger points used to determine which of several IMS application servers (AS) to invoke.

Interaction between multiple application servers is handled by the (under-specified) Service Capability Interaction manager (SCIM) function. It is in many ways a more modern version of the classic Intelligent Network (IN) model used for telephony systems in the past. In the 3rd wave video system and today's increasingly web-based technology world, users and services both need to be considered as first-class citizens that are equally capable of initiating service to each other. Furthermore, an open framework of orchestrating such services is important, including responses to events in the system.

With SIP/IMS being designed around the need to establish a communication session (e.g., a call), it is not well suited to exchange structured data as part of a session by itself. For example, support for large messages is an issue over user datagram protocol (UDP), and SIP proxies are in general not intended to have frequent or substantial amounts of data sent through them. However, several video control plane services need that capability (e.g., remote scheduling, companion device experiences, interactive diagnostics, etc.).

Certain embodiments of video system 10 can offer an overall video services control plane architecture that addresses the above shortcomings. In accordance with one example implementation of the present disclosure, video system 10 can resolve the aforementioned issues (and potentially others) to provide a combination of cloud, network, and client capabilities that enables the service provider to offer its subscribers any content over any network to any device. The present disclosure provides the first complete instantiation of an end-to-end video platform solution supporting the full complement of managed video service offerings.

Within the platform of FIG. 1, the functional components are logically grouped into different suites. Extending beyond the core platform are components that are assumed to be preexisting, within either the service provider or the content provider networks. Specifically, service provider Business Support Systems/Operations Support Systems (SP BSS/OSS) represents a set of preexisting business and operations support systems. 3rd party web services are cloud-based services that the solution leverages, but are preexisting and can be leveraged in-place. Content provider control systems are preexisting or future systems that support the delivery of content into secondary distribution channels. A collection of different networks (both service provider managed networks and other networks) can also be provided that play a role in the delivery of the video service. Finally, the architecture can also include existing on-demand and linear content sources, representing both the origination of that content from the content provider/broadcaster, as well as the acquisition of that content within the service provider's network. The solid and dashed lines in this area represent the distinction between content metadata and content essence (the actual media files, etc.).

The cloud paradigm can extend the media and acquisition suites with enhanced capabilities for linear and time-shifted TV. The communication platform also introduces conductor and conductor services, providing an extensible service creation environment, common service capabilities, as well as massively scalable and persistent client connection technologies. Three additional suites are also provided, which includes the ad suite (represented as 'Advanced Advertising' in FIG. 1) that provides a core set of advanced advertising capabilities that integrates a web ad decision server capabilities. In addition, an application suite (e.g., Video System Enabled Services) is provided that builds on the base soft client capability provided in QuickStart. It also provides a base set of core and value-add end-user applications across both managed and unmanaged devices. A management suite (e.g., end to end system management) is also provided for client and endpoint management; it facilitates management of the overall video platform suite of products.

Video system 10 also builds on the distribution suite capabilities for the efficient delivery of both on-demand and linear content to client devices. The content delivery network (CDN) capability can be responsible for taking content that originates from the Content management/media processing functions, and delivering it to clients at scale, efficiently, and with minimal end-to-end latency. The CDN can provide a high degree of deployment flexibility: scaling from more centralized deployments to highly-distributed deployments using centralized root caching tiers, multiple intermediate caching tiers, and edge-caching tiers close to the client devices. CDN also provides intelligent content routing capabilities that are tied, through network proximity, to the real-time routing details of the underlying network elements. This enables the service provider to efficiently deliver content from the best edge cache resource, even during periods of network impairment.

The architecture also covers soft clients as well as managed devices. Specifically, the architecture includes a video system home gateway, as well as a video system IP STB. The home gateway, as an extension of the network, provides valuable linkage between managed and unmanaged devices within the home and the service provider cloud and network infrastructures. The IP STB, as well as all soft clients running on unmanaged devices, is designed to work across managed and unmanaged network environments. Soft client capabilities can be extended to include linear and time-shift capabilities, as well as leverage the evolving set of cloud and network APIs exposed by the various suites to provide a high-quality end-to-end user experience.

Video system 10 presents a migration to an all-IP based video and services infrastructure spanning the full service/content life cycle, from the video content and metadata acquisition, to content and metadata preparation, distribution, and delivery to the end-user. The video system encompasses a set of diverse products/suites with heterogeneous interfaces and implementations for these functions. The overall system follows a Service Oriented Architecture (SOA) development framework and, hence, supports multiple individual services, which are used via service orchestration and workflow engines. Each of the suites provides a set of well-defined services and associated interfaces, and it is with these services that end-user services are eventually provided. End-user services can be defined as including one or more services that users interact with to provide a user visible service. For example, a linear TV service provides features and logic to enable users to watch a particular channel in accordance with their subscription. The linear TV service does so by use of a number of underlying video system services and suites. Application suite services play a particular role in terms of providing application logic for one or more services. Users could be machines as well (e.g., for machine-to-machine oriented type services).

In certain implementations of the present disclosure, video system 10 can leverage a set of HTTP-based RESTful web services to support basic on-demand TV everywhere capabilities. These HTTP services, exposed to end-points by both the media suite and the distribution suite, can provide proven scalability, resiliency, and extensibility. In operation, the video platform can use a mix of HTTP RESTful web services and XMPP-based services, providing a powerful combination to support the enhanced capabilities for linear, time-shift TV, VOD, companion, and value-add applications.

Figure 2:
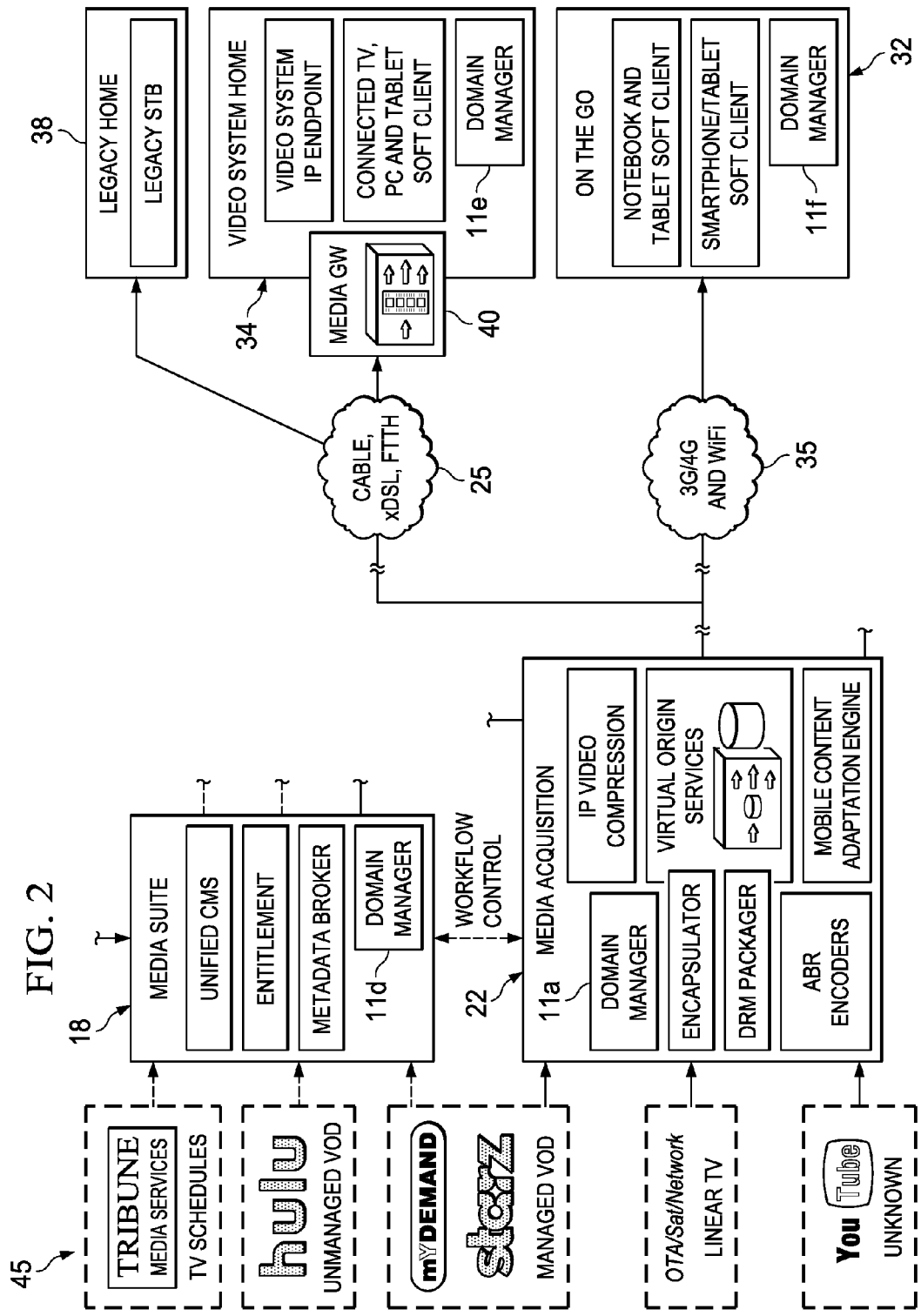
FIG. 2 is a simplified block diagram illustrating possible example details associated with one embodiment of the video system.

Turning to FIG. 2, FIG. 2 illustrates a number of example content sources 45 (e.g., YouTube™, Starz™, HULU, etc.). Devices and services can be divided into client-facing and cloud-facing components. Client-facing components and services can involve interaction with a client. Cloud-facing components and services can include everything else. In either case, services provide well-defined XMPP and/or HTTP-based interfaces. XMPP-based services can rely on the conductor infrastructure and the features it provides (e.g., service virtualization or persistent connections), whereas HTTP-based services in the video system can follow a standard web-services model.

Clients may interface directly with a service or they may interact with a front-end application/service, which in turns orchestrates and invokes other services (e.g., by use of the flexible workflow engine provided by service orchestration). Similarly, services may also rely on backend application logic to implement higher-level applications/services, which again may rely on service orchestration of other services. On the client itself, there may be one or more applications installed, and applications may contain add-on modules. In either case, the client-side application interacts with the video system cloud via one or more service invocations (e.g., "Create Recording" to schedule an nDVR recording, which is supported by a service or application front-end via HTTP or XMPP).

In operation, the media suite (unified CMS, entitlement, metadata broker, LSMS/EPG manager, etc.), the distribution suite (which is the content distribution that includes the service router, service engine/edge cache, etc.), the advertising suite, and the application suite can expose services that clients consume. The client-facing interfaces can be HTTP-based, and for the video system, they can continue to be HTTP-based, or they as well as other applications and services may be HTTP and/or XMPP based. In either case, efficient mechanisms can be used for clients to initially discover these services, select the instance of the component that can best fulfill service requests from that client, and manage the allocation of finite resources across all instances of that service. The video system can offer a unified service discovery capability through the conductor's service directory for both XMPP and HTTP-based services. For XMPP-based conductor services, service virtualization can be provided natively by the conductor infrastructure.

Figure 3:
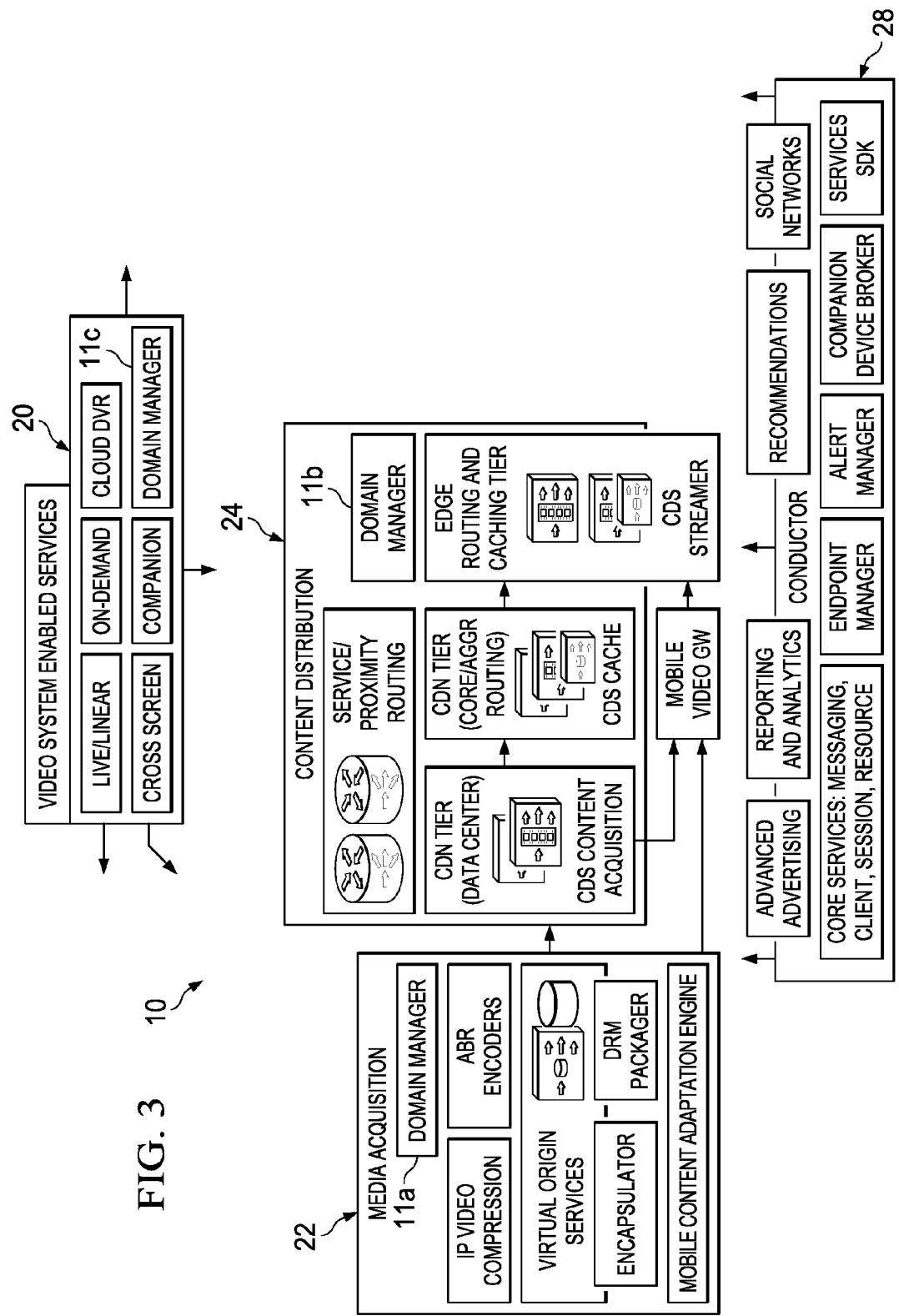
FIG. 3 is a simplified block diagram illustrating possible example details associated with one embodiment of the video system.

FIG. 3 is a simplified block diagram highlighting the video system enabled services, along with the conductor capabilities. The acquisition suite services, while not directly consumed by client endpoints, provide critical media processing services to the media suite and the distribution suite and, therefore, are also considered. Service routing and service virtualization for the media suite, the acquisition suite, and the distribution suite can continue to leverage existing implementations. Specifically, the media suite currently provides a global server loadbalancing (GSLB)/APACHE web services mechanism for service virtualization and loadbalancing. The acquisition suite can provide loadbalancing for video on demand (VOD) transcoding through its transcode manager server; expanded mechanisms for service virtualization and loadbalancing for linear and VOD transcoding and encapsulation can also be provided in the video system. The distribution suite provides a service router based mechanism for virtualization and edge cache selection. The ad suite message exchanges are stateless with transaction data being maintained and replicated across the virtualized service cluster allowing any virtual endpoint to process a message exchange. For services accessed using traditional HTTP message exchanges, an appliance, or other hardware loadbalancer may be used. Alternatively, a loadbalancer or a software loadbalancer may be adopted in alignment with the overall video system architecture. When the ad suite is accessed using XMPP, the integrated video system conductor service virtualization is leveraged for loadbalancing and high availability.

Video system users can subscribe to the video services through their service provider. One or more users and devices may be associated with an account for service, and associated with each is a profile to enable personalization of the video services. Devices range from IP set-top boxes to soft clients on a variety of devices such as PCs, MAC devices, tablets, smartphones, etc., and all of those devices may be used either on the service provider's access network (home), or another network (e.g., on the go). Users may also have a video system home gateway, which could be a residential NAT/firewall type device with additional video features, such as media caching, and multicast-to-unicast conversion to optimize the end-user video experience and to reduce use of access network resources (especially when users have multiple devices accessing the same content). Cable and Telco (xDSL, Fiber, etc.) access networks are supported as managed networks, where quality of service and policy control enable a better end-user video experience than for unmanaged access network, that provide an over-the-top experience instead.

Users and devices can connect to the video system infrastructure using primarily persistent XMPP connections and stateless HTTP-based web services. The conductor provides the XMPP infrastructure to which clients (users/devices) connect via the connection manager and have their identity authenticated, thereby enabling a secure and personalized service experience. The conductor provides a basic set of connection management, messaging and core services, and additional services enablement features to allow for new services to be introduced. Services and applications can connect to the conductor, thereby enabling them to use the core services provided by the conductor, as well as exchange messages with each other through the XMPP messaging infrastructure.

Core services provided by the conductor include the client directory, which contains user and device profile information, and the publish-subscribe subsystem (PubSub), which enables listeners to subscribe to and be notified about events generated by publishers for a given topic. The session state manager tracks state associated with sessions (e.g., a video session when watching a movie), and the resource broker allows resources (e.g., network bandwidth), to be associated with that session. The application suite provides a set of supporting front-end and backend application logic to deliver the linear and time-shift TV, nDVR, on-demand, soft client download for certain platforms, value-added applications, and a web portal e-commerce platform for the on-demand storefront.

Figure 4:
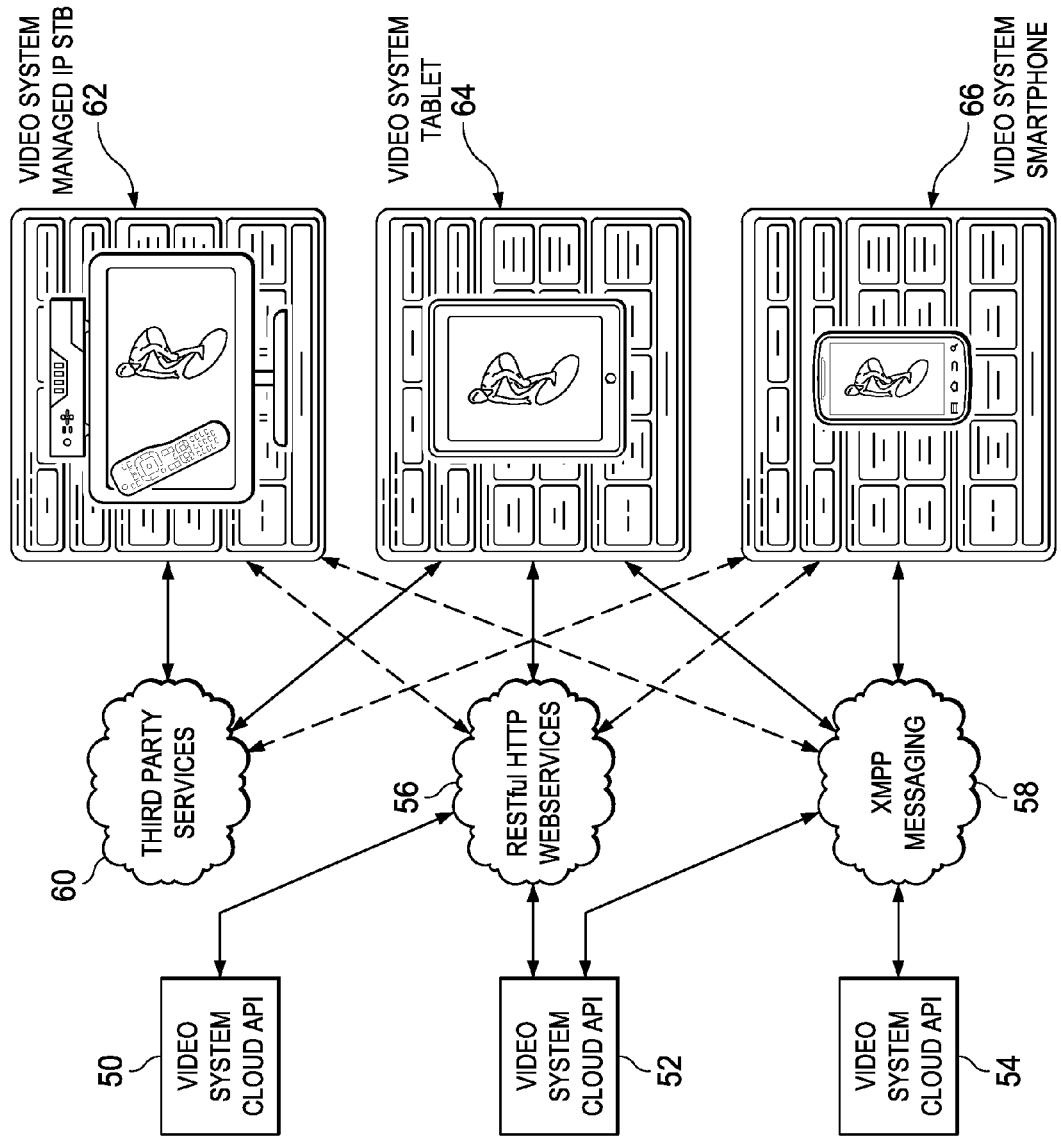
FIG. 4 is a simplified block diagram illustrating possible example details associated with one embodiment of the video system.

FIG. 4 is a simplified block diagram illustrating the video systems cloud APIs and clients. In this particular example, a video system cloud API 50 is provided as being connected to a RESTful HTTP web services network 56. In addition, other instances of a video system cloud API 52, 54 are coupled to an XMPP messaging cloud 58. An instance of third-party services 60 is also being illustrated and is coupled to a video system managed IP set-top box 62. Additionally, a video system iOS tablet 64 and a video system Android smartphone 66 are suitably connected to a given network. The cloud APIs can enable a consistent user experience. Additionally, the cloud APIs can leverage the best of XMPP and HTTP. The client SDKs can facilitate cloud API use across diverse platforms. Additionally, the cloud APIs can access third-party services.

Figure 5:
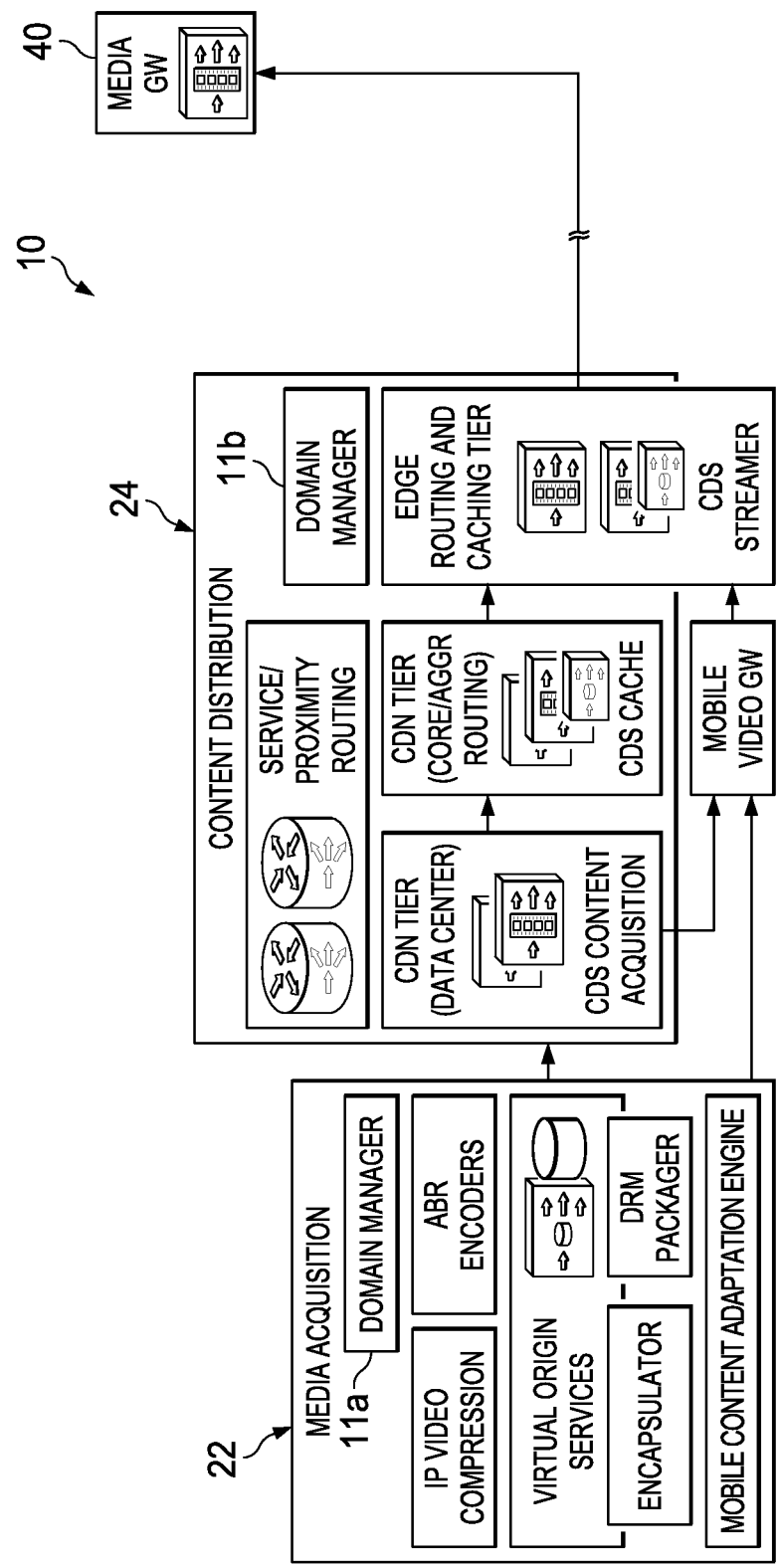
FIG. 5 is a simplified block diagram illustrating possible example details associated with one embodiment of the video system.

FIG. 5 is a simplified block diagram illustrating the content distribution suite and the media acquisition suite. In certain example implementations, the program guide retrieval and media delivery is HTTP-based. Video delivery supports adaptive bitrate, and it can utilize the distribution suite for efficient, service provider-scale video delivery. The distribution suite provides for distributed content caching throughout the network. HTTP requests for content can be sent to the service router (SR) first, which uses the proximity engine (PxE) to perform a proximity-based redirection of the HTTP request to a service engine (SE) for efficient media delivery. When the service engine receives the request, it either serves it from its cache, another service engine (higher in the caching hierarchy), or it contacts the content acquisition function, which retrieves the content from an origin server (in the acquisition suite). The distribution suite can be used for efficient delivery of any cacheable application object such as generic program guides, whereas personalized program guides may be retrieved directly from the media suite instead. In either case, clients may learn about new program guides being available by use of the PubSub XMPP service for program guide updates.

Figure 6:
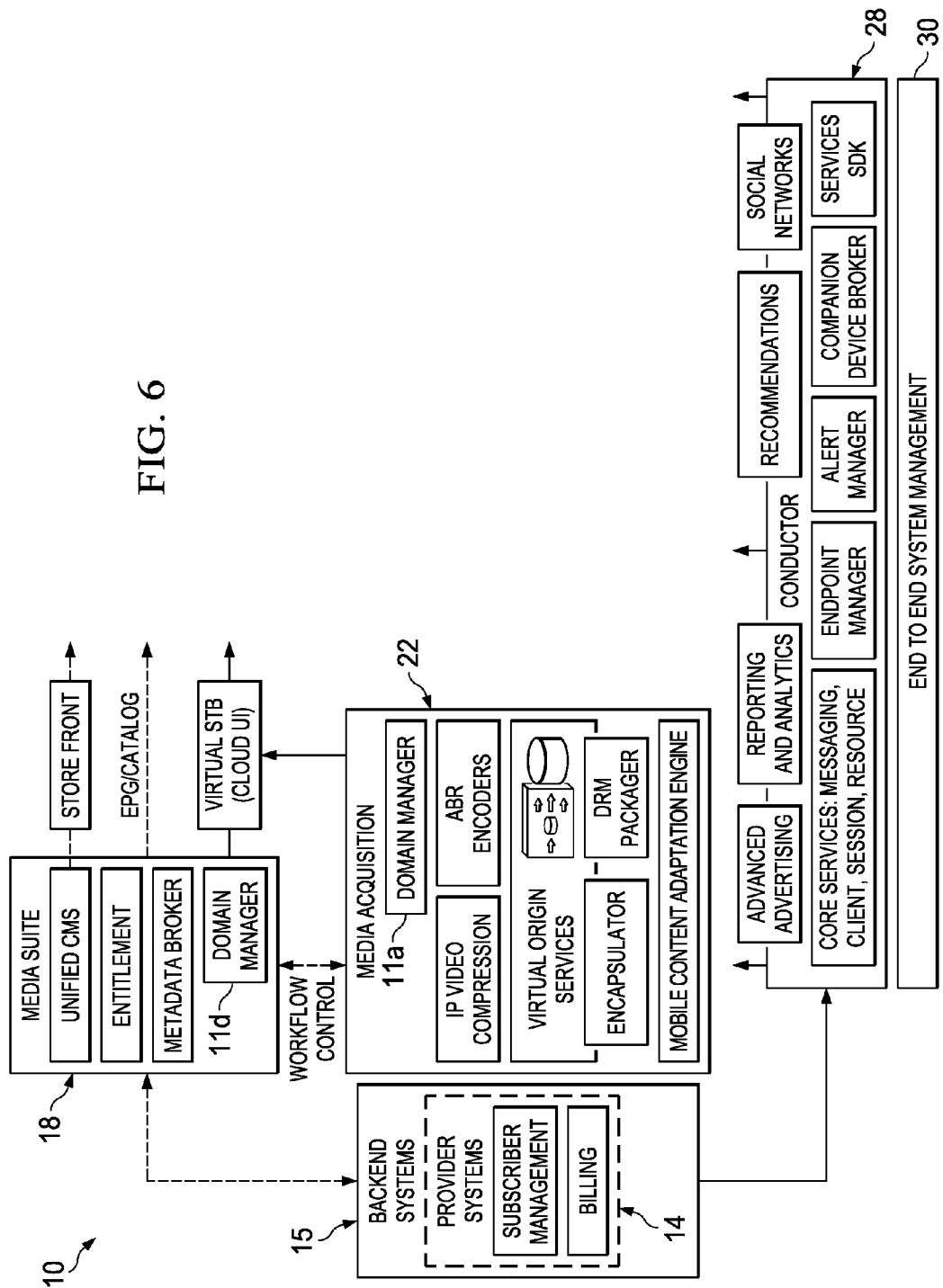
FIG. 6 is a simplified block diagram illustrating possible example details associated with one embodiment of the video system.

FIG. 6 is a simplified block diagram illustrating additional details associated with the media suite, provider systems, etc. The media suite component receives content metadata and electronic program guide (EPG) information from a multitude of content providers that are serving up managed and unmanaged content. The media suite normalizes this information and produces program guides for the associated content. This can involve using the LSMS/EPG manager for mapping content to channels, respecting blackout indications for content in certain regions, determining Digital Rights Management (DRM) to be applied, etc. The program guides typically vary by region based on locally available content, and program guides may vary on a per-user basis as well (personalized program guides). Similar functionality is provided for on-demand content, which can be made available and visible to end-users. Once the associated content is available, the media suite can then publish the program guide and catalog information for that content. The media suite additionally supports a variety of time-shift TV experiences, bridging the linear and on-demand domains; the DVR CMS function can provide content management functions in this regard. The media suite provides a unified entitlement capability, enabling the service provider to provide support for multiple leading DRM ecosystems. Individual assets (on-demand, linear channels, applications), both managed and unmanaged, are combined into offers by the media suite publisher capability. For example, the service provider may choose to provide a unified VOD catalog that contains a mix of actively managed content as well as unmanaged content from aggregators such as Hulu.

Metadata associated with this content can be served by the metadata broker, which also serves metadata associated with program guides and nDVR recordings. Managed content can be acquired, transcoded, encrypted, and delivered by the service provider's infrastructure (acquisition suite), whereas the unmanaged content processing and delivery is the responsibility of the aggregator. Assets from both can be seamlessly merged into unified offers and presented to the user in a common catalog. In the case of managed content, the client can interact with the media suite entitlement management server. If the user is entitled to the content, the content resolution server (CRS) function decides on one or more suitable formats to serve up the content for the client in question; the formats may in turn depend on certain content policies controlled by the content policy function. In the case of unmanaged content, the client will interface directly to the aggregator's backend entitlement/delivery systems at the time of asset playback.

Before a user is permitted to watch certain content, whether it is linear or on-demand, the content can be made available. Unmanaged content is neither cached nor processed by the video system network, but is instead delivered over-the-top (OTT) as any other IP traffic. However, managed content can be acquired from the content provider, and possibly transformed in a multitude of ways. The acquisition suite serves this role by (re)encoding the content in possibly several different formats (codecs, resolutions, etc.) to support a multitude of end-user devices and the adaptive bitrate delivery of said content. VOD transcoding is done by a transcode manager, linear transcoding can be done by the digital content manager (DCM) and media processor, and ABR formatting can be handled by the media encapsulator. Encryption for DRM can also be provided. The acquisition suite and media suite coordinate with each other to determine what content to acquire, when the content is available and, hence, can be published in a catalogue, and which DRM to apply. Once the content has been transformed as appropriate, it can be stored on the origin server function, and the content is then available for distribution to endpoints. The content can then either be pushed out to the distribution suite (pre-fetching), or the distribution suite will retrieve and cache it when needed.

In spite of the use of HTTP ABR, some content may be served by multicast; the home gateway can translate between multicast delivery and unicast HTTP ABR to optimize access network and CDN (distribution suite) use. The multicast manager advertises statically and potentially dynamically provisioned multicast sessions defining the multicast cloud that determines the multicast senders, as well as the coverage for that multicast tree. The virtual origin service (VOS) embeds capabilities such as encapsulation, time-shifted representations, recording for nDVR, and multicast origination for multicast-cache fill; the service router function enables efficient service routing request handling across multiple VOS instances (e.g., to use a topologically close-by VOS).

Based on the program guide information, VOD catalog, etc., the client can have an HTTP URL for the content it wishes to acquire (e.g., a TV channel, a movie on-demand, etc.). When the client issues a request for said content, it will need to go through an entitlement check to determine if it's allowed to obtain the content requested. The entitlement check is performed by the media suite, which interfaces to the DRM/license servers to obtain DRM ecosystem-specific license keys that enable decryption of the DRM protected content.

The ad suite placement broker accepts advertising placement queries (e.g., in the form of an Society of Cable Telecommunications Engineers (SCTE) 130 Part 3 PlacementRequest message), from any initiating source (be it a client or the cloud). The placement broker gathers additional targeting criteria relative to both the content and the viewer from a combination of internal and external sources. For content specific metadata, the media suite's metadata broker and/or a 3rd party metadata source are queried using the SCTE 130 Content Information Service (CIS) interface. User or content viewer information is obtained from a combination of internal and/or 3rd party sources using the SCTE 130 Subscriber Information Service (SIS) interface. Example SIS metadata sources include video system's geolocation service, conductor's client directory service, indirect access to the service providers subscriber data, or an external 3rd party such as Experian.

One or more placement opportunities (a more generalized form of a traditional linear element that includes metadata describing decision ownership, policy, ad unit structure) can be obtained from a component implementing the SCTE 130 Placement Opportunity Information Service (POIS) interface. Based on ownership and provisioned placement service criteria, the placement broker applies the appropriate metadata visibility policies and routes the individual placement opportunities to the correct advertising decision service. The advertising decision service may be a component of a 3rd party campaign manager or it may be the ad suite's web ADS router. The web ADS router forwards decision requests to a 3rd party web ad decision server such as DoubleClick™ or Freewheel™ using their native request format and receives an Interactive Advertising Bureau (IAB) Video Ad Serving Template (VAST) 2.0 response. The placement broker aggregates the sum of advertising placement decisions and returns the result to the initiating source using a SCTE 130 PlacementResponse message. The initiating source then intermixes the entertainment content and the selected advertising assets using the appropriate delivery platform specific assembly mechanism (for example, manifest manipulation for HLS, or player control for client HSS/Smooth™, etc.).

The placement reporter acquires media session events including placement, playout, session, viewer, and remote control events, filters these events according to the provisioned placement service policies, and forwards the appropriate confirmation reports to the individual advertising decision services. The web ADS router provides an additional forwarding capability proxying to the VPAID format. The placement reporter also archives the data for later analysis and provides report generation support.

The management suite fulfills the management aspects (FCAPS) of the video system. The device manager performs basic hardware and firmware device management for video system managed devices (i.e., set-top boxes and home gateways, whereas the endpoint manager supports overall management for all video system clients in the form of application download, provisioning, event collection and reporting, etc.). Domain managers are subsystem managers for each product suite. A domain manager is either located in the management suite itself or it is a product in another suite that fulfills a dual role. Finally, the video system manager of managers (MoM) can offer an overall manager for the various management components of the platform.

The video system architecture defines several third-party elements that are not associated with any particular suite. Within the video system box, the Authentication/Authorization/Single-Sign-On (AA/SSO) function provides a common backend AA and SSO solution that allows for common credentials and single sign-on between different suites and interfaces. The accounting function enables storage of accounting data (e.g., for quality statistics), and the DOCSIS and Telco Policy functions provide policy server functions for Cable and Telco access networks. Outside the video system box, a number of third-party elements for 3rd Party web services, service provider BSS/OSS, Content Provider (CP) Control Systems, as well as EPG schedule information, VOD and Linear Content Sources, Integrated Receiver Decoders (IRD), Emergency Alert System (EAS), and Public CDNs are defined as well.

Turning to the example infrastructure associated with present disclosure, the clients of FIG. 1 can be associated with devices, customers, or end-users wishing to receive data or content in video system 10 via some network. The term 'client' is inclusive of devices used to initiate a communication, such as a receiver, a computer, a set-top box, an IRD, a cell phone, a smartphone, a tablet, a remote control, a personal digital assistant (PDA), a Google droid, an iPhone, and iPad, or any other device, component, element, or object capable of initiating voice, audio, video, media, or data exchanges within video system 10. The clients may also be inclusive of a suitable interface to the human user, such as a display, a keyboard, a touchpad, a remote control, or other terminal equipment. The clients may also be any device that seeks to initiate a communication on behalf of another entity or element, such as a program, a database, or any other component, device, element, or object capable of initiating an exchange within video system 10. Data, as used herein in this document, refers to any type of numeric, voice, video, media, or script data, or any type of source or object code, or any other suitable information in any appropriate format that may be communicated from one point to another.

The networks of FIG. 1 can represent a series of points or nodes of interconnected communication paths for receiving and transmitting packets of information that propagate through video system 10. The networks can offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as any wireless configuration, any enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

Any of the suites, backend systems, the conductor, end to end system management, etc. can be representative of network elements that can facilitate the video management activities discussed herein. As used herein in this Specification, the term 'network element' is meant to encompass any of the aforementioned elements, as well as routers, switches, cable boxes, iPads, end-user devices generally, endpoints, gateways, bridges, STBs, loadbalancers, firewalls, inline service nodes, proxies, servers, processors, modules, or any other suitable device, component, element, proprietary appliance, or object operable to exchange content in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, these network elements can include software to achieve (or to foster) the video management activities discussed herein. This could include the implementation of instances of domain manager 11a-f. Additionally, each of these elements can have an internal structure (e.g., a processor, a memory element, etc.) to facilitate some of the operations described herein. In other embodiments, these video management activities may be executed externally to these elements, or included in some other network element to achieve the intended functionality. Alternatively, these network elements may include software (or reciprocating software) that can coordinate with other network elements in order to achieve the video management activities described herein. In still other embodiments, one or several devices may include any suitable algorithms, hardware, software, components, modules, interfaces, or objects that facilitate the operations thereof.

Figure 7:
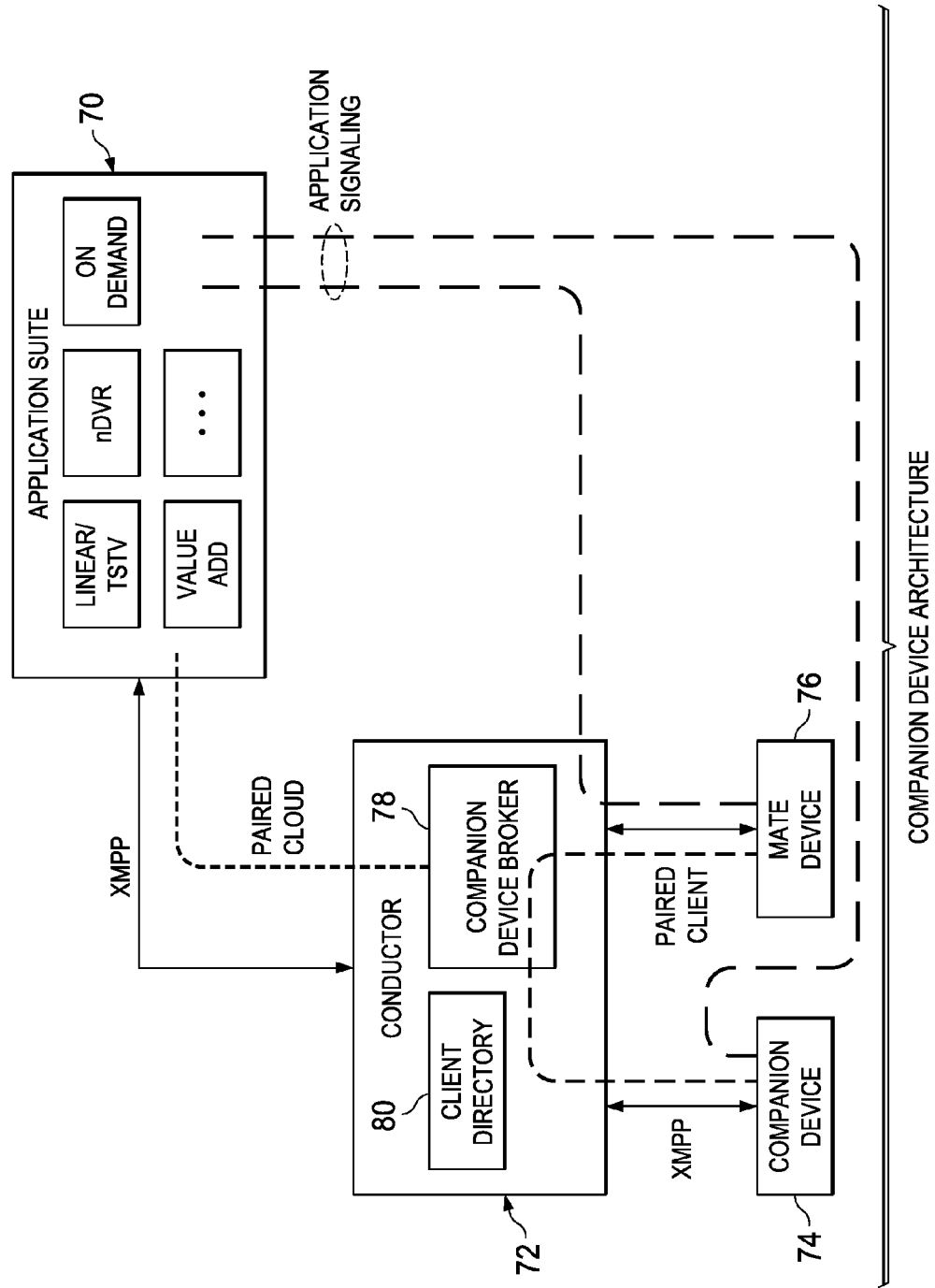
FIG. 7 is a simplified block diagram illustrating possible example details associated with one embodiment of a companion device architecture.

Turning to FIG. 7, FIG. 7 illustrates a companion device architecture associated with the present disclosure. This particular configuration includes a conductor 72, which includes a client directory 80 and a companion device broker 78. Also provided in this particular illustration is an application suite 70, which includes linear/time-shift TV, nDVR, ondemand, value add, etc. A companion device 74 pairs with a mate device 76 to perform companion services. The companion signaling flows between companion device 74 and mate device 76 via companion device broker 78. The companion signaling in the form of application signaling may also flow from application suite 70 to a companion device broker 78.

In general terms, the platform of FIG. 7 can offer a cross-screen and companion device architecture, which enables service providers to orchestrate and securely support cross-screen and companion device services. The infrastructure can support consistent and centrally managed authentication, authorization, and policy control of such services. It can also provide a general framework, which enables any combination of legacy and new devices to engage in the services. A taxonomy is defined for such services, along with descriptions about how each of the resulting classes can be supported. This is performed in a way that minimizes the impact on existing service implementations and, furthermore, can be positioned within an existing user identity and service authorization framework.

This platform can enable service providers to orchestrate and securely support cross-screen and companion device services, instead of current ad-hoc device-centric or legacy-centric approaches. Additionally, it can provide for a consistent user experience for all types and combinations of devices, including extensions to migration scenarios. It can also provide a manageable infrastructure that enables simple and consistent authenticated and authorized use of such services. It can also provide a taxonomy with a consistent strategy for supporting different types of cross-screen and companion device services with minimal impact on the basic service implementations.

Turning to the infrastructure of this platform, the companion device reflects the device a companion service is started from (e.g., an iPad). The mate device is the device for performing a companion service with the companion device (e.g., an IP STB). The pairing activity is the act of associating a companion device with a mate device for performing a companion service. The companion device broker is a trusted intermediary entity within the video control plane that enables and controls pairing of devices for cross-screen and companion services.

In terms of cross-screen and companion device services, these can be divided into several categories. For the paired companion device use cases, these involve a companion device and a mate device pairing with one another. Two cases can exist: 1) paired client use cases, where the companion device and the mate device should pair and exchange information with each other to support the use case (e.g., the remote control use case); and 2) paired cloud use cases, where the companion device and the mate device should pair and access shared information in the cloud; however, they do not need to exchange information with each other to support the use case (e.g., real-time updates would be a use case). Unpaired companion device use cases can involve a companion device and/or a mate device; however, the two do not pair with one another. Remote DVR scheduling would be an example of this issue.

For paired companion device services, the companion device broker plays a central role by: 1) acting as a trusted intermediary that enables pairing of the companion and mate device; 2) enabling the exchange of information between the companion and mate device in paired client scenarios; and 3) facilitating access to (and correlation of) cloud-based information between the companion and mate device.

Device pairing can be limited to devices and users associated with a single account, as reflected in the client directory. The client directory also enables a companion device use case to determine the type, capabilities, and availability of a companion device and a mate device. For example, in the case of a remote control, the companion device should pair with a STB device that is currently active. The exact instance may involve user interaction (e.g., select from a list of active devices listed on the companion device).

For the paired client use cases, the companion device architecture can be based on the companion device sending relevant messages to the mate device, and the mate device then uses those messages to trigger mate device actions, as if they had been triggered locally on the mate device to begin with. For example, for the remote control use case, the companion device may send a "tune to channel 123" or "play on-demand video xyz" message to the mate device, and the mate device can perform the operations, just as if the mate device had triggered those operations locally to begin with. By using this principle, existing services (both client-based and cloud-based services) are impacted minimally (if at all), and support for the service on the companion and mate device is simplified.

Note how the companion device broker acts as the trusted intermediary to both authorize and support this communication between the two devices. Conductor/XMPP can be used as the interface since it provides a persistent connection to the companion and mate device and, further, also supports communication initiated in either direction (direct communication may be supported as an optimization as well; however, issues related to NAT traversal, security, etc. complicate such a model). The companion device broker can perform authorization checks before allowing two devices to pair. For example, screen shifting of a movie started by one user may not be allowed by all other users in the account. The presence infrastructure provided by the conductor enables a companion device to try to pair with active mate devices only. In order to facilitate troubleshooting and traceability, whenever a command is issued by the mate device (as a result of a companion device message), the command in question should convey that information (e.g., including the identity of the companion device).

Some companion device use cases can involve sharing or exchanging of cloud-based information between service instances for the companion device and the mate device. For example, complementary social media may involve the companion device to know the program being watched on the mate device. To enable such use cases, the corresponding application suite component can interact with the companion device broker to determine the paired devices. The companion device broker can again also act as a trusted intermediary (within the cloud this time) to allow a companion device to obtain information about the program currently being watched on the mate device (other more general "channel presence" solutions may be possible; however, they can involve further privacy and authorization considerations). Similarly, a screen shift scenario may have the companion device broker access information in a video control plane session manager for the mate device session (e.g., a paused TV show) and enable it to be used on the companion device to resume playing there (possibly in a different resolution). For the screen shift "fling" scenario, the real-time aspect of the shift will likely use a direct exchange of information between the two devices to synchronize the shift.

Companion device use cases apply to migration scenarios as well. A migration scenario may involve a cloud rendered UI provided by the cloud on behalf of legacy STBs that have not been fully enhanced with IP video support. In such a scenario, a migration cloud component acts on behalf of the legacy STB. The migration component contains the logic to support new and advanced services; it receives inputs from the legacy STB, performs the application logic, and renders the resulting viewable output for display on the legacy STB. This enables new advanced features to be provided for such legacy STBs as well. The cross-screen and companion device architecture and approach described above can be applied in such scenarios by having the migration component provide the companion or mate device logic similar to that described above. The legacy STB can include support for the paired client scenario since it still should tune to the relevant channels. The migration component (infrastructure that generates the cloud rendered UI) would support the companion device use cases as well.

Figure 8:
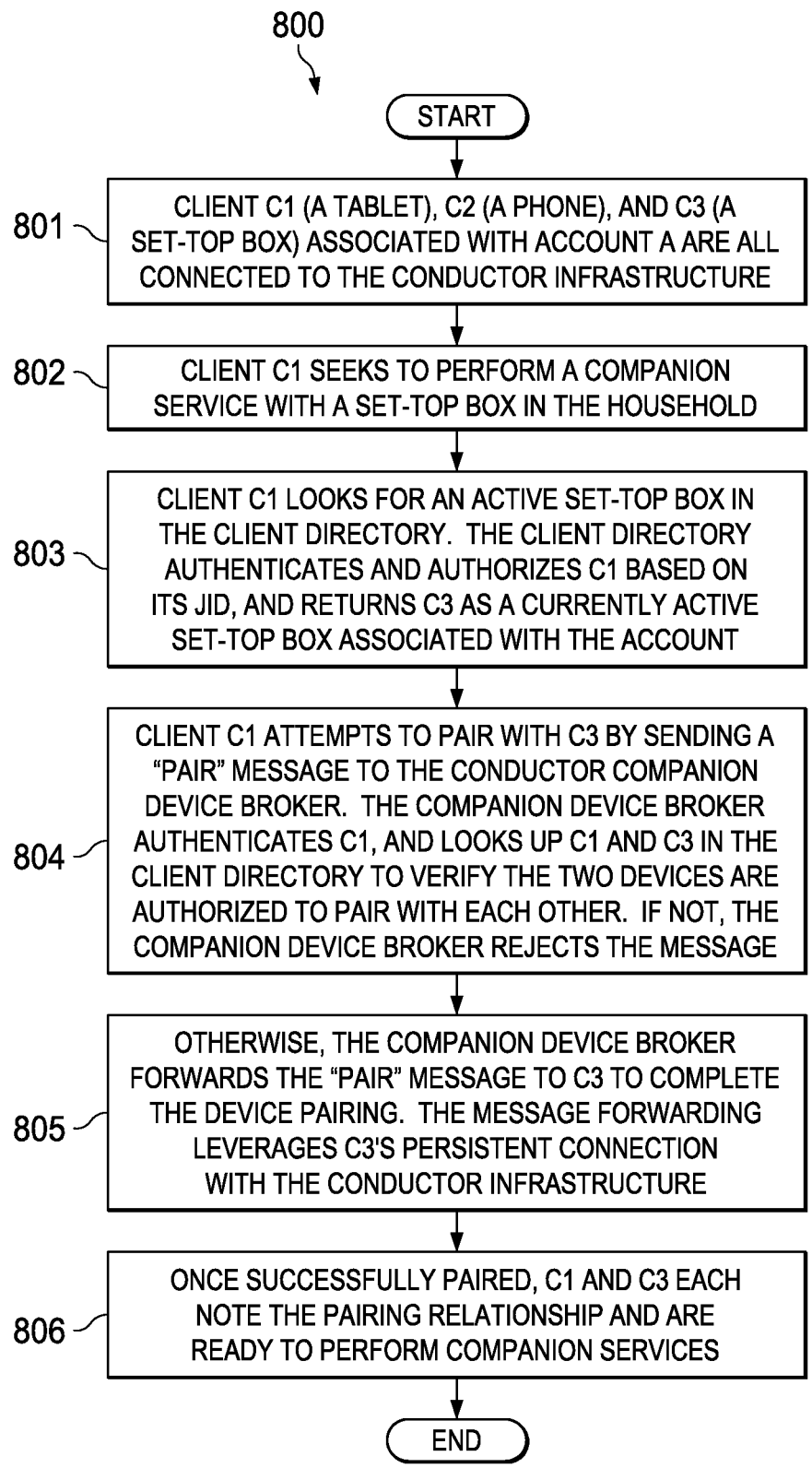
FIGS. 8-10 are simplified flowcharts illustrating potential operations associated with the video system in accordance with one embodiment of the present disclosure.

Turning to FIG. 8, FIG. 8 is a simplified flowchart 800 illustrating example activities associated with device pairing of the present disclosure. The flow may begin at 801, where Client C1 (a tablet), C2 (a phone), and C3 (a set-top box) associated with account A are all connected to the conductor infrastructure. At 802, Client C1 seeks to perform a companion service with a set-top box in the household. At 803, Client C1 looks for an active set-top box in the client directory. The client directory authenticates and authorizes C1 based on its JID, and returns C3 as a currently active set-top box associated with the account. At 804, Client C1 attempts to pair with C3 by sending a pair message to the conductor companion device broker. The companion device broker authenticates C1, and looks up C1 and C3 in the client directory to verify the two devices are authorized to pair with each other. If not, the companion device broker rejects the message. Otherwise, at 805, the companion device broker forwards the pair message to C3 to complete the device pairing. The message forwarding leverages C3's persistent connection with the conductor infrastructure. Once successfully paired, C1 and C3 each note the pairing relationship and are ready to perform companion services, as shown at 806.

Figure 9:
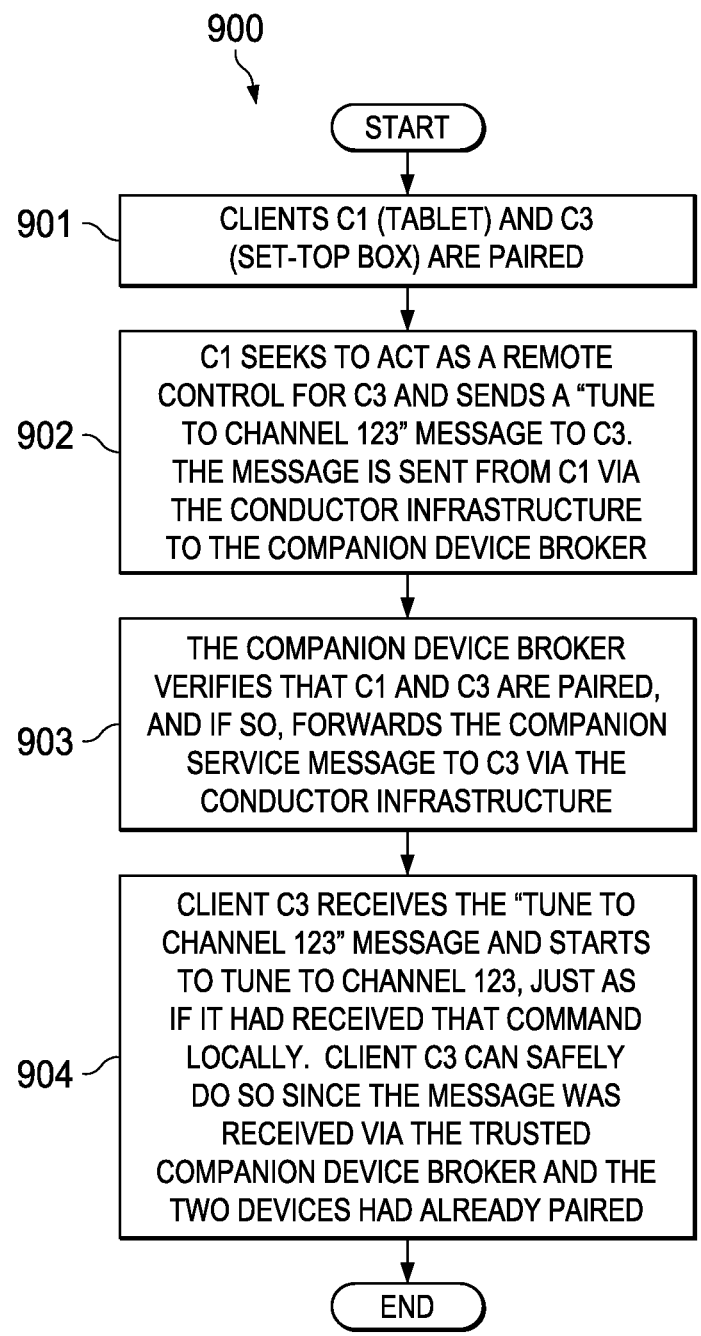

Turning to FIG. 9, FIG. 9 is a simplified flowchart 900 illustrating example activities associated with a paired client companion service of the present disclosure. The flow may begin at 901, where Clients C1 (tablet) and C3 (set-top box) are paired. At 902, C1 seeks to act as a remote control for C3 and sends a "tune to Channel 123" message to C3. The message is sent from C1 via the conductor infrastructure to the companion device broker. At 903, the companion device broker verifies that C1 and C3 are paired and, if so, forwards the companion service message to C3 via the conductor Infrastructure. Optionally, additional policy checks may be performed by the companion device broker to determine the message handling. At 904, Client C3 receives the "tune to Channel 123" message and starts to tune to channel 123, just as if it had received that command locally. Client C3 can safely do so since the message was received via the trusted companion device broker and the two devices had already paired. Optionally, Client C3 may perform additional local policy checks.

Figure 10:
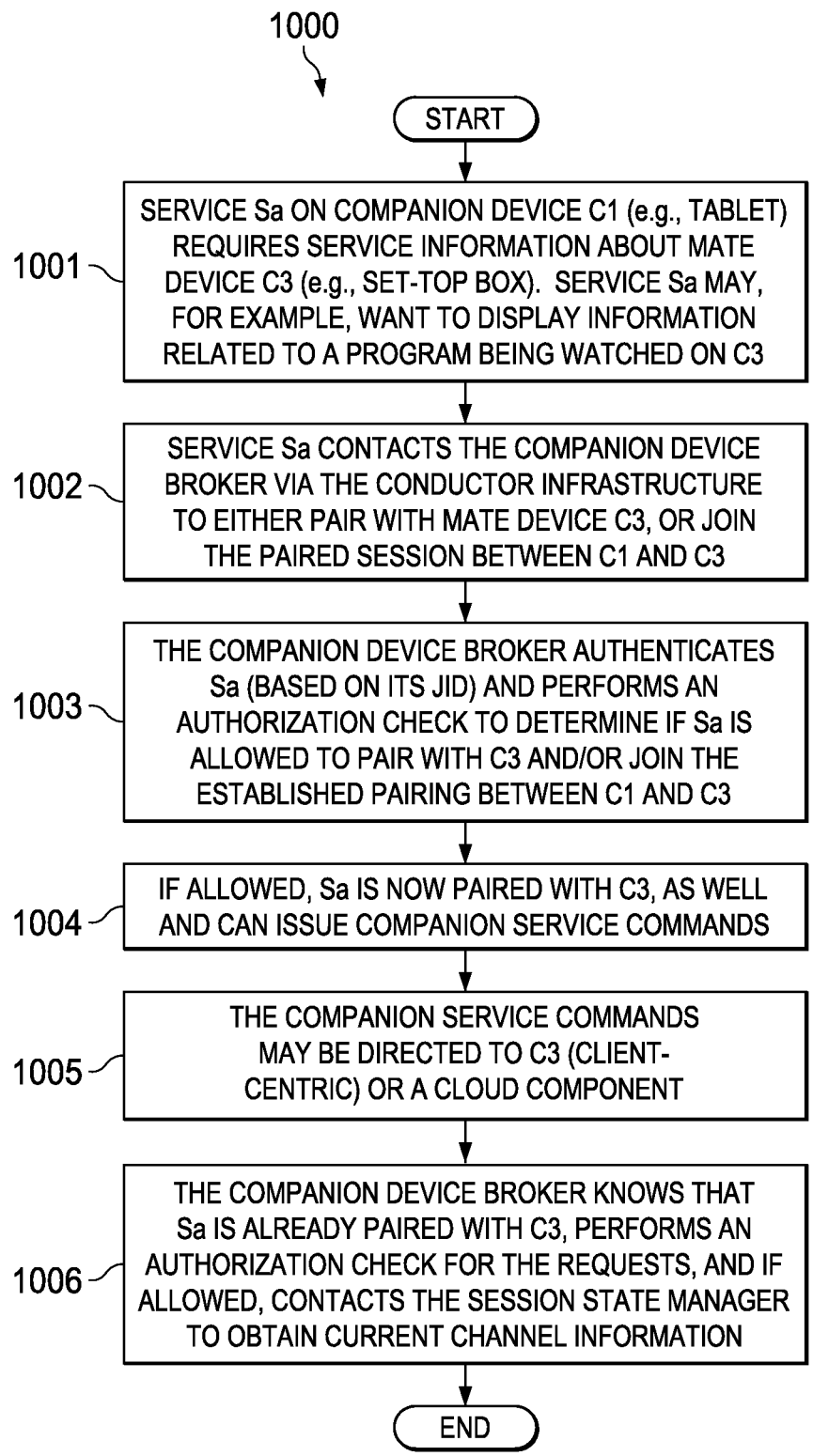

Turning to FIG. 10, FIG. 10 is a simplified flowchart 1000 illustrating example activities associated with paired cloud/service companion service activities of the present disclosure. The flow may begin at 1001, where Service Sa on companion device C1 (e.g., tablet) seeks service information about mate device C3 (e.g., set-top box). Service Sa may, for example, seek to display information related to a program being watched on C3. At 1002, Service Sa contacts the companion device broker via the conductor infrastructure to either pair with mate device C3, or join the paired session between C1 and C3.

At 1003, the companion device broker authenticates Sa (based on its JID) and performs an authorization check to determine if Sa is allowed to pair with C3 and/or join the established pairing between C1 and C3. If allowed, Sa is now paired with C3 and can issue companion service commands, as shown at 1004. At 1005, companion service commands may be directed to C3 (client-centric) or a cloud component. For example, a (cloud) session state manager service may have information about the currently watched channel on C3. Sa issues a "get current channel" to the companion device broker. The companion device broker understands that Sa is already paired with C3, performs an authorization check for the requests and, if allowed, contacts the session state manager to obtain current channel information. This is being illustrated by 1006. Note that C1 and Sa would normally not be allowed to perform such a request directly to the session state manager; the companion device broker acts as a trusted intermediary to authorize the request. Alternatively, the request could be directed to the client (client-centric approach) again leveraging the companion device broker as a trusted intermediary.

As identified previously, a network element can include software (e.g., domain manager 11a-f) to achieve the video management operations, as outlined herein in this document. In certain example implementations, the video management functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processors provided in any of the suites, in conductor 28, in media gateway 34, anywhere in legacy home 38, video system home 34, in backend systems 15, in end to end system management 30, etc.]). In some of these instances, a memory element [provided in any of the suites, in conductor 28, in media gateway 34, anywhere in legacy home 38, video system home 34, in back-end systems 15, in end to end system management 30, etc.] can store data used for the operations described herein. This includes the memory element being able to store instructions (e.g., software, code, etc.) that are executed to carry out the activities described in this Specification. The processors can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the video management operations as outlined herein. Additionally, each of these devices may include a processor that can execute software or an algorithm to perform the video management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that video system 10 (and its teachings) are readily scalable and, further, can accommodate a large number of components, as well as more complicated/sophisticated arrangements and configurations. Accordingly, the examples provided should not limit the scope or inhibit the broad teachings of video system 10, as potentially applied to a myriad of other architectures.

It is also important to note that the steps in the preceding FIGURES illustrate only some of the possible scenarios that may be executed by, or within, video system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by video system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for providing a companion device service, comprising:
    establishing a persistent connection between a first client and a messaging fabric of a conductor element associated with a video system;
    receiving a pair message at the conductor element from the first client over the persistent connection to attempt to pair with the second client;
    verifying, using a client directory at the conductor element, whether the first client and the second client are authorized to be paired for providing the companion device service; and
    if the first client and the second client are authorized to be paired:
        pairing, using the client directory at the conductor element, the first client with the second client; and
        acting, by the conductor element using a companion device broker therein, as a trusted intermediary to share, with the first client, the second client's access to information in a cloud component associated with the video system to provide the companion device service,
    wherein sharing comprises:
    receiving a request from the first client at the conductor element via the persistent connection for information associated with a session between the second client and the cloud component associated with the video system,
    verifying that the first client is paired with the second client, and
    if the first client is paired with the second client, contacting, by the companion device broker, a session state manager associated with the video system to obtain the information associated with the session,
    wherein the information in the cloud component associated with the session is provided to the first client and used on the first client resume playing a video of the session, and
    wherein the first client is configured to play the video of the session in a different resolution from the resolution used to play the video at the second client.

2. The method of claim 1, further comprising:
    if the second client and the first client are authorized to be paired, forwarding the pair message, by the companion device broker of the conductor element, to the second client to complete the pairing between the first client and the second client.

3. The method of claim 1, wherein the persistent connection between the first client and the messaging fabric of the conductor element comprises an Extensible Messaging and Presence Protocol (XMPP)-based and/or Hypertext Transfer Protocol (HTTP)-based connection.

4. The method of claim 1, wherein the video system follows a service oriented architecture (SOA) development framework for delivering video to the first client and the second client using persistent Extensible Messaging and Presence Protocol (XMPP) connections and/or stateless Hypertext Transfer Protocol (HTTP)-based web services.

5. The method of claim 1, wherein the video system provides Extensible Messaging and Presence Protocol (XMPP)-based and/or Hypertext Transfer Protocol (HTTP)-based interfaces that are accessible by the conductor element.

6. The method of claim 1, wherein acting, by the conductor element using the companion device broker therein, as the trusted intermediary to authorize exchange of information between the first client and the second client for the companion device service, comprises:
   receiving a message from the first client at the conductor element via the persistent connection triggering an action to be performed by the second client; and
   verifying that the first client is paired with the second client;
   if the first client is paired with the second client, forwarding the message from the first client through the companion service broker to the second client enabling the second client to trigger the action as if the second client had received the message locally.

7. The method of claim 1, further comprising:
   providing the information associated with the session from the companion device broker to the first client via the persistent connection.

8. Logic encoded in one or more non-transitory media that includes instructions for execution and when executed by a processor is operable to perform operations for providing a companion device service, comprising:
   establishing a persistent connection between a first client and a messaging fabric of a conductor element associated with a video system;
   receiving a pair message at the conductor element from the first client over the persistent connection to attempt to pair with the second client;
   verifying, using a client directory at the conductor element, whether the first client and the second client are authorized to be paired for providing the companion device service; and
   if the first client and the second client are authorized to be paired:
      pairing, using the client directory at the conductor element, the first client with the second client; and
      acting, by the conductor element using a companion device broker therein, as a trusted intermediary to share, with the first client, the second client's access to information in a cloud component associated with the video system to provide the companion device service,
   wherein sharing comprises:
   receiving a request from the first client at the conductor element via the persistent connection for information associated with a session between the second client and the cloud component associated with the video system, verifying that the first client is paired with the second client, and
   if the first client is paired with the second client, contacting, by the companion device broker, a session state manager associated with the video system to obtain the information associated with the session,
   wherein the information in the cloud component associated with the session is provided to the first client and used on the first client resume playing a video of the session, and
   wherein the first client is configured to play the video of the session in a different resolution from the resolution used to play the video at the second client.

9. The logic of claim 8, wherein the operations further comprise:
   if the second client and the first client are authorized to be paired, forwarding the pair message, by the companion device broker of the conductor element, to the second client to complete the pairing between the first client and the second client.

10. The logic of claim 8, wherein the video system follows a service oriented architecture (SOA) development framework for delivering video to the first client and the second client using persistent Extensible Messaging and Presence Protocol (XMPP) connections and/or stateless Hypertext Transfer Protocol (HTTP)-based web services.

11. The logic of claim 8, wherein the video system provides Extensible Messaging and Presence Protocol (XMPP)-based and/or Hypertext Transfer Protocol (HTTP)-based interfaces that are accessible by the conductor element.

12. An apparatus for providing a companion device service, comprising:
   a memory element configured to store instructions;
   a processor coupled to the memory element; and
   a conductor element comprising and a companion service broker, wherein the apparatus is configured to:
      establish a persistent connection between a first client and a messaging fabric of a conductor element associated with a video system;
      receive a pair message at the conductor element from the first client over the persistent connection to attempt to pair with the second client;
      verify whether the first client and the second client are authorized to be paired for providing the companion device service; and
      if the first client and the second client are authorized to be paired:
         pair the first client with the second client; and
         act, using a companion device broker in the conductor element, as a trusted intermediary to share, with the first client, the second client's access to information in a cloud component associated with the video system to provide the companion device service,
   wherein sharing comprises:
   receiving a request from the first client at the conductor element via the persistent connection for information associated with a session between the second client and the cloud component associated with the video system,
   verifying that the first client is paired with the second client, and
   if the first client is paired with the second client, contacting, by the companion device broker, a session state manager associated with the video system to obtain the information associated with the session,
   wherein the information in the cloud component associated with the session is provided to the first client and used on the first client resume playing a video of the session, and
   wherein the first client is configured to play the video of the session in a different resolution from the resolution used to play the video at the second client.

13. The apparatus of claim 12, wherein the conductor element is further configured to:

if the second client and the first client are authorized to be paired, forward the pair message, by the companion device broker of the conductor element, to the second client to complete the pairing between the first client and the second client.

14. The apparatus of claim 12, wherein the persistent connection between the first client and the messaging fabric of the conductor element comprises an Extensible Messaging and Presence Protocol (XMPP)-based and/or Hypertext Transfer Protocol (HTTP)-based connection.

15. The apparatus of claim 12, wherein the conductor element comprises a client directory and wherein the apparatus is configured to use the client directory to verify whether the first client and the second client are authorized to be paired and/or to pair the first client with the second client.

16. A method for providing a companion device service, comprising:
    establishing a persistent connection between a first client and a messaging fabric of a conductor element associated with a video system;
    receiving a pair message at the conductor element from the first client over the persistent connection to attempt to pair with the second client;
    verifying whether the first client and the second client are authorized to be paired for providing the companion device service; and
    if the first client and the second client are authorized to be paired:
        pairing, the first client with the second client; and
        acting, by the conductor element using a companion device broker therein, as a trusted intermediary to share, with the first client, the second client's access to information in a cloud component associated with the video system to provide the companion device service,
    wherein sharing comprises:
    receiving a request from the first client at the conductor element via the persistent connection for information associated with a session between the second client and the cloud component associated with the video system,
    verifying that the first client is paired with the second client, and
    if the first client is paired with the second client, contacting, by the companion device broker, a session state manager associated with the video system to obtain the information associated with the session,
    wherein the information in the cloud component associated with the session is provided to the first client and used on the first client resume playing a video of the session, and
    wherein the first client and the second client are configured to exchange information through the companion device broker of the conductor element to synchronize a screen-shifting of the video between the first client and the second client.

17. The method of claim 16, wherein the verifying comprises verifying using a client directory at the conductor element and/or the pairing comprises pairing using the client directory at the conductor element.

18. The method of claim 16, further comprising:
    if the second client and the first client are authorized to be paired, forwarding the pair message, by the companion device broker of the conductor element, to the second client to complete the pairing between the first client and the second client.

19. The method of claim 16, wherein the persistent connection between the first client and the messaging fabric of the conductor element comprises an Extensible Messaging and Presence Protocol (XMPP)-based and/or Hypertext Transfer Protocol (HTTP)-based connection.

20. An apparatus for providing a companion device service, comprising:
    a memory element configured to store instructions;
    a processor coupled to the memory element; and
    a conductor element comprising and a companion service broker, wherein the apparatus is configured to:
        establish a persistent connection between a first client and a messaging fabric of a conductor element associated with a video system;
        receive a pair message at the conductor element from the first client over the persistent connection to attempt to pair with the second client;
        verify whether the first client and the second client are authorized to be paired for providing the companion device service; and
        if the first client and the second client are authorized to be paired:
            pair the first client with the second client; and
        act, using a companion device broker in the conductor element, as a trusted intermediary to share, with the first client, the second client's access to information in a cloud component associated with the video system to provide the companion device service,
    wherein sharing comprises:
    receiving a request from the first client at the conductor element via the persistent connection for information associated with a session between the second client and the cloud component associated with the video system,
    verifying that the first client is paired with the second client, and
    if the first client is paired with the second client, contacting, by the companion device broker, a session state manager associated with the video system to obtain the information associated with the session,
    wherein the information in the cloud component associated with the session is provided to the first client and used on the first client resume playing a video of the session, and
    wherein the first client and the second client are configured to exchange information through the companion device broker of the conductor element to synchronize a screen-shifting of the video between the first client and the second client.

21. The apparatus of claim 20, wherein the apparatus is further configured to:
    if the second client and the first client are authorized to be paired, forward the pair message, by the companion device broker of the conductor element, to the second client to complete the pairing between the first client and the second client.

22. The apparatus of claim 20, wherein the persistent connection between the first client and the messaging fabric of the conductor element comprises an Extensible Messaging and Presence Protocol (XMPP)-based and/or Hypertext Transfer Protocol (HTTP)-based connection.

* * * * *